INVENTOR
Richard HETMANN

United States Patent Office 3,399,743
Patented Sept. 3, 1968

3,399,743
DRIVE UNIT FOR VEHICLES
Richard Hetmann, Tamm, Wurttemberg, Germany, assignor to Firma Dr. Ing. h.c. F. Porsche K.G., Stuttgart-Zuffenhausen, Germany
Filed Mar. 3, 1966, Ser. No. 531,583
Claims priority, application Germany, Mar. 25, 1965, P 36,381
4 Claims. (Cl. 180—55)

ABSTRACT OF THE DISCLOSURE

A drive unit for vehicles, especially for motor vehicles which consists of a block arranged transversely to the driving direction between the driven wheels and including the internal combustion engine, the change-speed gear and the axle gear, in which the axle gear is accommodated laterally offset with respect to the change-speed gear and is in permanent driving connection therewith by means of a constantly meshing connecting gear. The connecting gear includes two toothed gears in engagement at a center of engagement wherein they each have mutually parallel axial planes and axial planes extending through the center of engagement and angularly intersecting each other.

Background of the invention

Drive units of this type possess the advantage that they can be accommodated in direct proximity to the coordinated driving axle both in the front as well as in the rear portion of the vehicle and thus may contribute considerably to the creation of good driving properties by a favorable position of the center of gravity. Notwithstanding the careful elastic support of the unit, these types of drive units operate relatively roughly and do not achieve the comfort, by which excel the drive units having the main axis directed longitudinally to the driving direction. This can be traced back essentially to the fact that the required speed reduction gear arranged between the change-speed gear and the axle gear, which in the preferred construction is a spur wheel gear having parallel axes of rotation, causes high operating noises by the mutual hitting abutment of the teeth. This disadvantage also cannot be eliminated by the use of spur gears with inclined teeth. In order to avoid these shortcomings, it has already been proposed heretofore to use speed-reduction gears whose gear wheels are provided with herringbone teeth. Apart from the high manufacturing costs which such a gear wheel unit causes, the damping of the operating noises cannot be enforced thereby to the desired extent.

Summary of the invention

According to the present invention, these disadvantages are avoided in that the axis of rotation of the axle gear, about which rotates the driven gear wheel of the connecting gear, is arranged inclined about the center of engagement of the connecting gear at an angle with respect to the axis of rotation of the shaft of the change-speed gear which carries the driving gear wheel of the connecting gear. Owing to the indicated crossing of the axes of rotation, there is made possible the application of a tooth construction for the connecting gear which, similar to a hypoid transmission, permits a specific gliding at the tooth flanks of the transmission gear wheels. As a result thereof- and without substantially greater expenditures, a smooth-running drive is created, in which the comfort conditions correspond to those of the usually customary standard drives. It is most favorable to construct the teeth according to the considerations of a worm drive, which enables the most noiseless operation, especially as the rigid installation required as a precondition offers no difficulties with the indicated transmission. The arrangement is preferably selected in such a manner that the axis of rotation of the axle gear, about which rotates the driven gear wheel of the connecting gear, extends in a plane which is parallel to the plane of the axis of rotation of the transmission shaft that carries the driving gear wheel of the connecting gear. Apart from the slightly inclined installation of the engine and of the change-speed gear, the remainder of the advantages of the drive units installed transversely to the driving direction is assured with such an arrangement. However, a construction may also be selected with the same advantages, in which the axis of rotation of the transmission shaft, about which rotates the driving gear wheel of the connecting gear, extends parallel to the axis of rotation of the vehicle wheels and the axis of rotation of the axle gear containing the driven gear wheel is arranged at an angle thereto. As a result thereof, with the usual installed position of the engine and of the change-speed gear, only the inclination of the axle gear relative to the wheel axle has to be compensated for, which can be realized without difficulty by means of joint-shafts that are provided for the drive of the vehicle wheels.

Accordingly, it is an object of the present invention to provide a transversely extending drive unit for vehicles, especially motor vehicles which avoids by extremely simple means the shortcomings and drawbacks encountered with the prior art constructions.

Another object of the present invention resides in a drive unit block consisting of engine, change-speed gear, and axle gear, which assures a completely satisfactory and smooth operation of the vehicle notwithstanding its installation substantially transversely to the driving direction of the vehicle.

A further object of the present invention resides in a transversely extending drive unit for motor vehicles which assures a driving comfort as regards smoothness of operation that is commensurate to the driving comfort normally experienced with drive units having the main axis thereof extending in the driving direction, and without requiring means that are either expensive and/or difficult to install.

Still another object of the present invention resides in a drive unit extending transversely to the driving direction of vehicles which is so arranged and constructed that a sufficient sliding movement is possible between the meshing gear teeth of the connecting gear operatively connecting the change-speed transmission with the axle gear.

Brief description of the drawing

These and further objects, features and advantages of the present invention will become more obvious from the following description when taken in connection with the accompanying drawing, which shows for purposes of illustration only, two embodiments in accordance with the present invention, wherein.

Description

Figure 1:
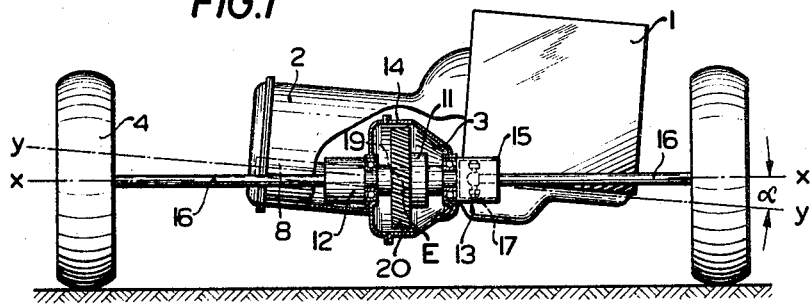
FIGURE 1 is a somewhat schematic front elevational view of a drive unit arranged between the driven wheels of a motor vehicle and provided with the arrangement and drive of the axle gear in accordance with the present invention.
Figure 2:
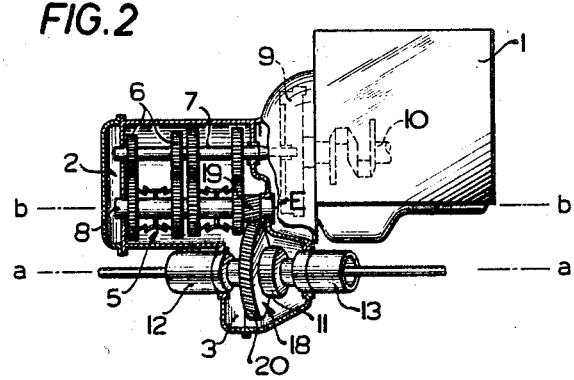
FIGURE 2 is a somewhat schematic longitudinal cross-sectional view through the drive unit block according to FIGURE 1, whereby the axle gear is illustrated, for sake of clarity, offset in a downward direction by 90°.

Referring now to the drawing, wherein like reference numerals are used throughout the various views to designate like parts, and more particularly, to FIGURES 1 and 2, the drive unit illustrated therein consists of an internal combustion engine 1, of a change-speed transmission 2 and of an axle gear 3 arranged laterally to the change-speed transmission 2. The drive for the vehicle wheels 4 is derived from the axle gear 3 in the usual manner. The change-speed transmission 2 which may be of any conventional construction comprises several pairs of gears 6 (FIG. 2) adapted to be engaged by conventional synchronizing clutches 5. The gears of the gear pairs 6 are mounted on the transmission drive shaft 7 and the transmission output shaft 8. The transmission drive shaft 7 is adapted to be connected by means of a friction disc clutch 9 with the crankshaft 10 of the internal combustion engine 1. The axle gear 3 consists of a conventional differential basket 11 containing the equalization bevel gears, not shown in detail, and the wheel drive shafts 12 and 13 which rotate about a common axis of rotation X—X corresponding to the axis of rotation of the wheels 4. The wheel drive shafts 12 and 13 are enlarged in a cup-like manner at the ends 15 thereof projecting beyond the housing 14 of the axle gear 3 and form, together with the joint parts secured at the half axles 16, a universal joint 17 that permits an independent wheel guidance and spring support of each of the two wheels 4. The drive of the axle gear 3 takes place from the change-speed transmission 2 by way of a continuously meshing speed reduction gear generally designated by reference numeral 18 (FIG. 2) whereby the driving gear wheel 19 of the connecting gear 18 is connected for rotation in unison with the transmission output shaft 8 and rotates about the axis of rotation Y—Y thereof. The driven gear wheel 20 of the connecting gear 18 is flangedly connected at the differential basket 11. The axis of rotation X—X about which rotates the driven gear wheel 20, is arranged, inclined about the center of engagement E of the connecting gear 18, at an angle α with respect to the axes Y—Y of the transmission output shaft 8. With the use of the crossing axes of rotation X—X and Y—Y of the axle gear 3 and of the change-speed transmission 2, a worm drive with gliding tooth engagement is selected for the teeth of the gear wheels 19 and 20 of the connecting gear 18. The inclination of the internal combustion engine 1 and of the change speed gear 2 relative to the road surface resulting from this arrangement is insignificant for the construction of the drive unit, if the axis of rotation X—X of the axle gear 3 together with the gear wheel 20 extends in a plane a—a (FIG. 2) which extends parallelly to the plane b—b of the axis of rotation Y—Y of the transmission output shaft 8, on which is accommodated the gear wheel 19 of the connecting gear 18. If the spatial conditions and the remaining transmission construction permit, an arrangement may also be chosen in which the axes of rotation X—X and Y—Y and the planes a—a and b—b cross one another. The drive of the wheels 4 takes place in both cases in a known manner from the internal combustion engine 1 by way of one of the speeds or transmission ratios 6 of the change-speed gear 2. The drive is transmitted from the change-speed gear 2 by way of the connecting gear 18 of the axle gear 3 and the half axles 16 to the wheels 4.

Figure 3:
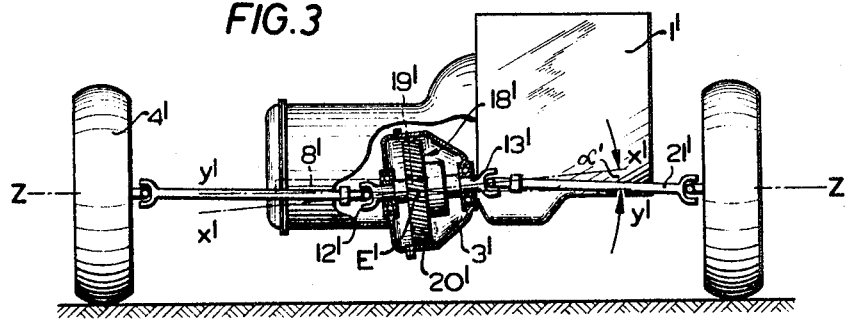
FIGURE 3 is a somewhat schematic elevational view of a modified embodiment of a drive unit block in accordance with the present invention.

A further modified embodiment is illustrated in FIGURE 3, which has, however, the same basic construction. The same parts are designated with the same, though primed, reference numerals.

In differentiation to the first described embodiment, the axis of rotation Y'—Y' of the transmission output shaft 8' of FIGURE 3, on which rotates the driving gear wheel 19' of the connecting gear generally designated by reference numeral 18' is arranged parallel to the axis of rotation Z—Z of the wheels 4' so that the internal combustion engine 1' assumes the usual customary position. In order to be able to utilize nonetheless a tooth arrangement, for example, constructed according to the consideration of a worm drive, with the center of engagement E' for the gear wheels 19' and 20', the axis of rotation X'—X' of the axle gear 3' is now inclined at an angle α' to the wheel axis Z—Z. The angular difference between the aforementioned axes of rotation X'—X' and Z—Z is compensated for the wheel drive by one double-joint-shaft 21' each, which are connected to the wheel drive shafts 12' and 13' of the axle gear 3'.

While I have shown and described two embodiments in accordance with the present invention, it is understood that the same is not limited thereto but is susceptible of numerous changes and modifications as known to a person skilled in the art. For example, the present invention is not limited to the particular embodiments illustrated and described herein but is also suitable for drive units, in which the internal combustion engine, the change-speed gear and the axle gear are arranged adjacent one another in three parallel planes. Furthermore, the solution according to the present invention is also applicable to transmission constructions with a coaxial arrangement of the transmission drive shaft and of the transmission output shaft.

Additionally, the present invention can also be modified by providing a connecting gear consisting not only of the driving gear wheel 19 and driven gear wheel 20 but of a driving gear wheel 19 rotatable on the shaft 8 of the transmission which drives an intermediate gear wheel that in turn drives the driven gear wheel 20 about the axis of the axle gear 3. In that case the axis of rotation Y—Y of the transmission shaft 8 and the axis of rotation X—X of the axle gear 3 can be arranged parallel to one another while the axis of rotation of the intermediate gear wheel is disposed at an angle α to the axis X—X or Y—Y. The use of an intermediate gear offers the advantage that the axes of rotation of the shafts of the change-speed transmission and of the axle gear can be arranged parallel to one another so that the inclined arrangement of the engine or of the axle gear relative to the road surface is dispensed with.

With such an arrangement, the axle gear 3 is again arranged laterally offset to the change-speed transmission whereby the vertical planes containing the axes of rotation of the driving gear wheel 19, the intermediate gear wheel and of the driven gear wheel 20 may again be arranged substantially parallel to one another. The axis of rotation of the intermediate gear forms again an angle α with respect to the axes X—X or Y—Y.

The driving gear 19, and the intermediate gear of the driven gear 20 may thereby be constructed in a conventional manner to provide worm drive to realize the optimum benefits of the present invention.

The arrangement of such modification may further be made in such a manner that the axes X—X and Y—Y lie in approximately the same horizontal plane with the axis of rotation of the intermediate gear wheel intersecting this horizontal plane at an angle α at the center of engagement of the intermediate gear with the corresponding gear wheel.

Thus, it is obvious that the present invention is not limited to the details shown and described herein, and I therefore do not wish to be limited thereto, but intend to cover all such changes and modifications as are encompassed by the scope of the appended claims.

I claim:
1. A drive unit for vehicles, especially for motor vehicles, comprising: block means disposed generally at right angles to the direction of travel between the driven wheels and including an internal combustion engine; change-speed transmission means operatively driven by said engine; axle gear means for driving said driven wheels being longitudinally spaced from said transmission means with respect to the direction of travel; continuously meshing connecting gears means drivingly connecting said change-speed transmission means with said axle gear means; said connecting gear means including a toothed driving gear having a first axis of rotation and a toothed driven gear constantly engaging said driving gear with a center of engagement and having a second axis of rotation; said axes of rotation being angularly inclined so that the plane passing through the center of engagement and said first axis of rotation and the plane passing through the center of engagement and said second axis of rotation intersect at an acute angle along a line generally passing through the center of engagement; said axes of rotation having mutually parallel and spaced planes extending therethrough and generally perpendicular to said line of intersection; said driving and driven gears each having a plurality of separate spaced gear teeth around their periphery; said teeth being generally cylindrically oriented with respect to their corresponding axes of rotation.

2. The drive assembly of claim 1, wherein said transmission means includes an output shaft coaxial with said first axis of rotation and said axle gear means includes output axle shafts coaxial with said second axis of rotation.

3. The drive assembly according to claim 2, wherein said first axis of rotation extends parallel to the axis of rotation of said driven wheels and wherein said second axis of rotation is skewed with respect to the axes of rotation of said driven wheels.

4. The drive unit according to claim 1, wherein said first axis of rotation extends parallel to the axis of rotation of said driven wheels and wherein said second axis of rotation is skewed with respect to the axes of rotation of said driven wheels.

References Cited

UNITED STATES PATENTS

| 2,008,724 | 7/1935 | Muller | 180—54 |
| 2,096,541 | 10/1937 | Haltenberger | 180—54 |
| 2,927,653 | 3/1960 | Peras | 180—42 |

A. HARRY LEVY, *Primary Examiner.*